T. J. O'BRIEN.
LOCKING DEVICE FOR AUTOMOBILES AND SIMILAR VEHICLES.
APPLICATION FILED JAN. 30, 1917.
1,244,237.
Patented Oct. 23, 1917.
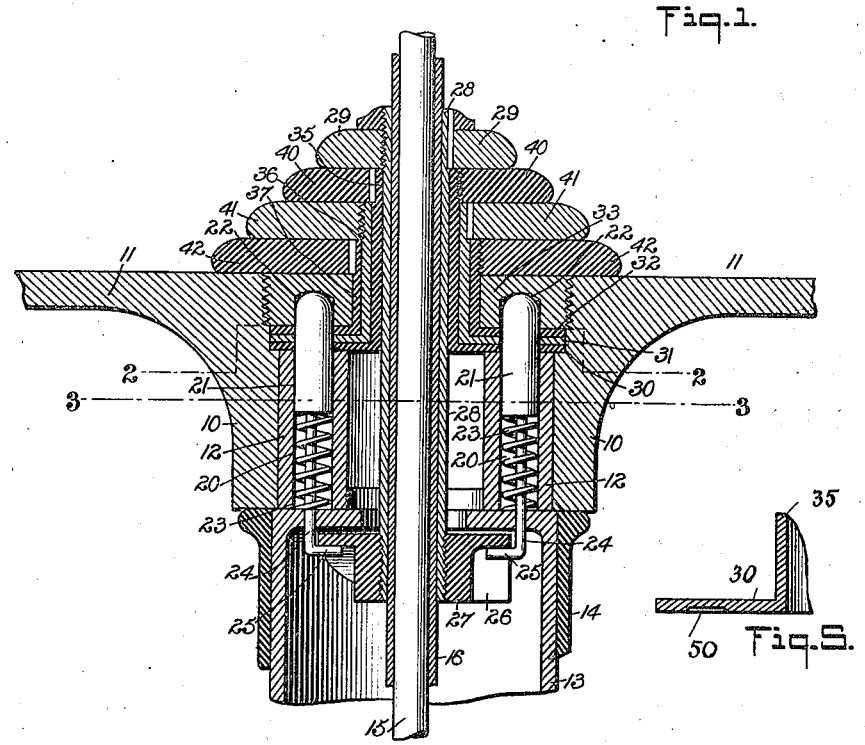
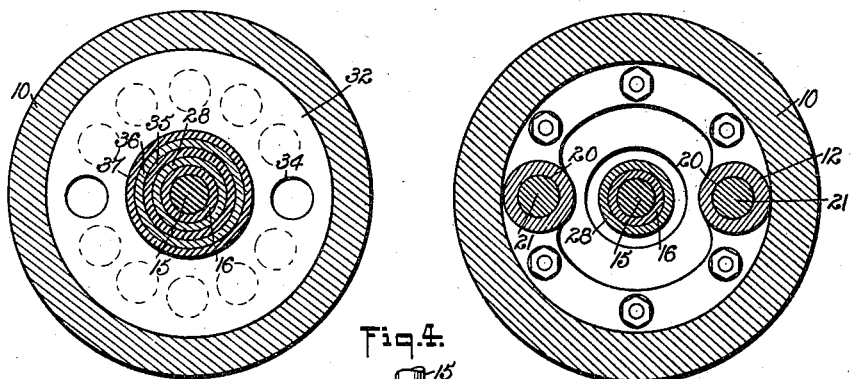
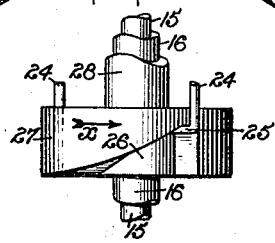
WITNESSES
INVENTOR
Thomas J. O'Brien
BY
ATTORNEYS

UNITED STATES PATENT OFFICE.

THOMAS JAMES O'BRIEN, OF MERIDEN, CONNECTICUT.

LOCKING DEVICE FOR AUTOMOBILES AND SIMILAR VEHICLES.

1,244,237.  Specification of Letters Patent.  Patented Oct. 23, 1917.

Application filed January 30, 1917. Serial No. 145,399.

*To all whom it may concern:*

Be it known that I, THOMAS J. O'BRIEN, a citizen of the United States, and a resident of Meriden, in the county of New Haven and State of Connecticut, have invented a new and Improved Locking Device for Automobiles and Similar Vehicles, of which the following is a full, clear, and exact description.

The object of the invention is to provide a new and improved locking device more especially designed for use on the steering shaft and steering wheel of an automobile or a similar vehicle to normally lock the steering wheel to the steering shaft with a view to permit the driver to steer the vehicle in the usual manner and to enable the driver to disconnect the steering wheel from the steering shaft to prevent an unauthorized person from turning the steering shaft.

In order to accomplish the desired result, use is made of a bolt adapted to lock the steering wheel to the steering shaft, manually controlled means for controlling the said bolt, and manually controlled means for preventing the bolt from engaging the steering wheel.

A practical embodiment of the invention is represented in the accompanying drawings forming a part of this specification in which similar characters of reference indicate corresponding parts in all the views.

Figure 1 is a sectional side elevation of the locking device as applied;

Fig. 2 is a sectional plan view of the same on the line 2—2 of Fig. 1;

Fig. 3 is a similar view of the same on the line 3—3 of Fig. 1;

Fig. 4 is a side elevation of the cam controlling bolt; and

Fig. 5 is a sectional side elevation of a portion of one of the tumbler disks.

The hub 10 of the steering wheel 11 is mounted to rotate loosely on an extension 12 bolted or otherwise attached to the upper end of the hollow steering shaft 13 extending in the usual manner through the fixed housing 14, and through the steering shaft 13, and the hub 10 of the steering wheel 11 extends the spark-controlling rod 15 passing through a tube 16 forming part of the usual gas control of the automobile.

The steering wheel 11 is adapted to be locked to the steering shaft 13 by the use of one or more bolts 21 each mounted to slide in a bearing 20 formed lengthwise in the shaft extension 12, and the upper end of each bolt 21 is adapted to engage a recess 22 formed in the hub 10 of the steering wheel 11 thus locking the steering wheel to the steering shaft 13 to permit of rotating the steering shaft on turning the steering wheel 11. Each bolt 21 is held in uppermost position by the action of a spring 23 mounted in the lower portion of the bearing 20 and seated on top of the steering shaft 13. A rod 24 extends from the lower end of each bolt 21 and passes centrally through the opening of the spring 23, and the lower end of the rod 24 projects into the upper end of the steering shaft 13 and is provided with an angular arm or a lug 25. The lug 25 engages a cam face 26 formed on the peripheral face of a cam 27 arranged within the upper end of the steering shaft 13. The cam 27 is provided with a tubular stem 28 fitting around the tube 16 of the gas control, and the upper end of the stem 28 is provided with a suitable knob 29 under the control of the operator for turning the cam 27 with a view to withdraw the bolt 21 from the corresponding recess 22 of the steering wheel 11 whenever it is desired to unlock the steering wheel relative to the steering shaft 13.

A series of superimposed tumbler disks 30, 31, 32 are interposed between the upper end of the shaft extension 12 and a shoulder 33 forming part of the hub 10 of the steering wheel 11, as plainly indicated in Fig. 1. Each of the disks 30, 31 and 32 is provided with two apertures 34 and the several apertures 34 of the disks are adapted to register with each other and with the bolts 21 and the recesses 22 to allow the bolts 21 to engage the said recesses 22 or to be moved out of engagement with the said recesses. The disks 30, 31 and 32 are provided with tubular stems 35, 36 and 37, of which the stem 35 is mounted to turn on the tubular stem 28, the stem 36 is mounted to turn on the stem 35, and the stem 37 is mounted to turn on the stem 36 and also extends through a central opening in the shoulder 33 of the hub 10. The outer ends of the stems 35, 36 and 37 are provided with knobs 40, 41 and 42, one on top of the other and preferably of different sizes, to provide a step like arrangement with a view to permit the driver to turn any one of the knobs 40, 41 or 42. The knob 29 for the stem 28 of the cam 27 is seated on top of the uppermost tumbler disk knob 40 while the lowermost knob 42 is seated on top of the steering wheel 11. Suitable positioning marks (not shown) are provided indicating the setting of the knobs 29, 40, 41 and 42 relative to the steering wheel 11.

The operation is as follows:—

When the apertures 34 of the several tumbler disks 30, 31 and 32 are in register with each other and with the bolts 21 and the recesses 22, and the cam 27 is in the position shown in Figs. 1 and 4 then the bolts 21 are held in uppermost position by the action of the spring 23 and extend partly in the bearings 20 and pass through the registering apertures 34 and engage the recesses 22. Thus the steering wheel 11 is locked by the bolts 21 to the shaft 13 and the automobile can be steered in the usual manner. When the automobile is stopped and the driver desires to lock the automobile against being driven off by an unauthorized person then the operator turns the knob 29 to give about a quarter turn to the cam 27 in the direction of the arrow $x$ shown in Fig. 4. The cam 27 by its cam face 26 exerts a desired pull on the rods 24 whereby the bolts 21 are withdrawn from the recesses 22 and out of the apertures 34, at the same time the springs 23 are placed under tension by the bolts. The operator now turns either one, or several, or all of the knobs 40, 41 and 42 so that the apertures 34 move out of register with each other and out of register with the bolts 21 and the recesses 22. It will be noticed that the steering wheel 11 is now unlocked relative to the steering shaft 13 and if turned by an unauthorized person it will not turn the steering shaft 13 and consequently the automobile cannot be steered. If an unauthorized person should turn the knob 29 to release the bolts 21 the latter cannot move up by the action of the springs 23 as the tops of the bolts abut against the under side of the tumbler disk 30. The driver knows the combination in which the knobs 40, 41 and 42 are set in order to register the apertures 34 with each other, but it is evident that an unauthorized person is not liable to turn the tumbler disks 30, 31 and 32 into such a position that the apertures 34 move into register with each other and with the bolts 21 and the recesses 22. On the other hand, the driver of the automobile whenever he desires to start up again can readily turn the knobs 29, 40, 41 and 42 to allow the bolts 21 to reëngage the tumbler disks 30, 31 and 32 as well as the recesses 22. The under sides of the tumbler disks 30, 31 and 32 are preferably provided with circular recesses 50 (see Fig. 5) arranged in the circle containing the apertures 34. Thus in case an unauthorized person turns the disks 30, 31 and 32, the bolts 21 are liable to snap into the recesses 50, thereby providing a clicking sound, thus misleading an unauthorized person trying to find the combination by sound.

Although I have shown two bolts 21, it is expressly understood that a single bolt or more than two bolts may be employed.

Having thus described my invention, I claim as new and desire to secure by Letters Patent:—

1. A locking device for connecting or disconnecting a steering wheel relative to the steering shaft of an automobile, comprising a slidable bolt adapted to lock the steering wheel to the steering shaft, a gas-control stem housed within the steering shaft, a sleeve surrounding said stem, means carried by said sleeve for actuating said bolt, and a series of superimposed manually controlled perforated disk tumblers interposed between the said steering shaft and steering wheel and adapted to be engaged by the said bolt.

2. A locking device for connecting or disconnecting a loose steering wheel relative to the steering shaft of an automobile, comprising a spring actuated bolt mounted to slide on the steering shaft in the direction of the length thereof and adapted to engage the steering wheel, a manually controlled cam connected with the said bolt to move the latter out of locking engagement with the steering wheel, and a series of superimposed disk tumblers interposed between the steering shaft and the steering wheel, the disk tumblers having apertures within their periphery adapted to be engaged by the said bolt, tubular telescoping sleeves connected to said tumblers and manually controlled means connected with the said sleeves to rotate the same and the tumblers.

3. A locking device for connecting and disconnecting a loose steering wheel relative to the steering shaft of an automobile, comprising a spring-pressed bolt mounted to slide on the steering shaft in the direction of the length thereof and adapted to engage the steering wheel to lock the latter to the steering shaft, a rod attached to the bolt and having an angular offset, a manually controlled cam mounted to turn within the steering shaft and engaged by the said angular offset, and a series of tubular telescoping sleeves mounted on the steering wheel and provided at their outer ends with knobs and at their inner ends with disks interposed between the steering shaft and the steering wheel, the disks having apertures adapted to register with each other and with the said bolt.

4. A locking device for connecting and disconnecting a loose steering wheel relative to the steering shaft of an automobile, comprising a spring-pressed bolt mounted to slide on the steering shaft in the direction of the length thereof and adapted to engage the steering wheel to lock the latter to the steering shaft, a rod attached to the bolt and having an angular offset, a cam within the said steering shaft and adapted to be engaged by the said offset to allow of withdrawing the bolt from the steering wheel, a sleeve on the said cam and provided at its outer end with a knob for manipulating the cam, a series of superimposed tumbler disks interposed between the steering wheel and the steering shaft, the disks having apertures adapted to register with each other and with the said bolt, and telescoping sleeves carrying the said disks and provided at their outer ends with knobs for setting or unsetting the disks.

5. A locking device for connecting or disconnecting a loose steering wheel relative to the steering shaft of an automobile, comprising a bolt mounted to slide on the steering shaft in the direction of the length thereof and adapted to engage the steering wheel, a manually controlled cam connected with the said bolt to move the latter out of locking engagement with the steering wheel, and a series of superimposed disk tumblers interposed between the steering shaft and the steering wheel, the disk tumblers having apertures adapted to be engaged by the said bolt, and the said disk tumblers being provided at the under side with recesses for engagement by the said bolt, and manually controlled means connected with the said disk tumblers to rotate the same.

THOMAS JAMES O'BRIEN.